No. 776,029. PATENTED NOV. 29, 1904.
J. H. PARMELEE.
HAME FASTENER.
APPLICATION FILED APR. 25, 1904.
NO MODEL.

WITNESSES:
H. A. Lamb
M. T. Longden

INVENTOR
J. H. Parmelee
BY
ATTORNEY

No. 776,029.

Patented November 29, 1904.

UNITED STATES PATENT OFFICE.

JOHN H. PARMELEE, OF BRIDGEPORT, CONNECTICUT, ASSIGNOR TO THE NORTH & JUDD MANUFACTURING COMPANY, OF NEW BRITAIN, CONNECTICUT, A CORPORATION OF CONNECTICUT.

HAME-FASTENER.

SPECIFICATION forming part of Letters Patent No. 776,029, dated November 29, 1904.

Application filed April 25, 1904. Serial No. 204,872. (No model.)

*To all whom it may concern:*

Be it known that I, JOHN H. PARMELEE, a citizen of the United States, residing at Bridgeport, in the county of Fairfield and State of Connecticut, have invented certain new and useful Improvements in Hame-Fasteners; and I do hereby declare the following to be a full, clear, and exact description of the invention, such as will enable others skilled in the art to which it appertains to make and use the same.

My invention relates to hame-fasteners, and has for its object to improve upon the construction shown and described in Letters Patent of the United States No. 423,529, issued to me March 18, 1890, and with these ends in view my present invention consists of certain details of construction and combination of parts, such as will be hereinafter fully set forth and then specifically designated by the claims.

Figure 1:
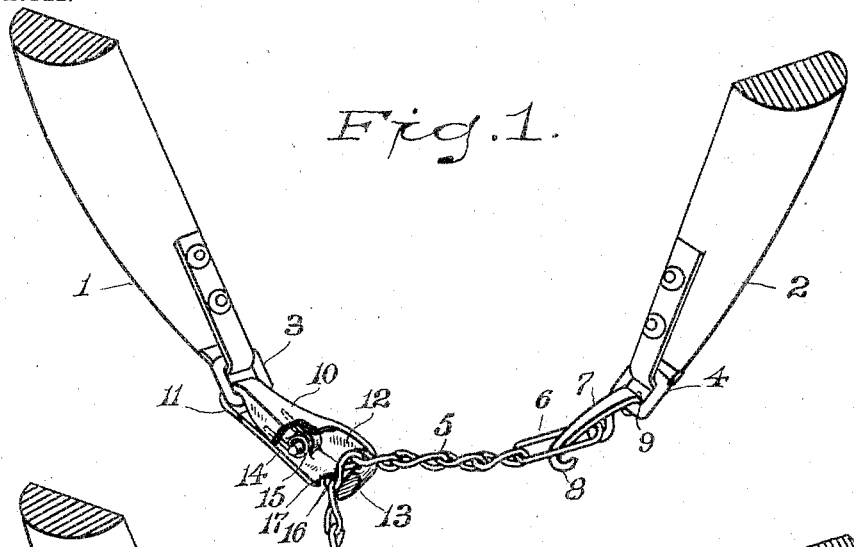
Figure 2:
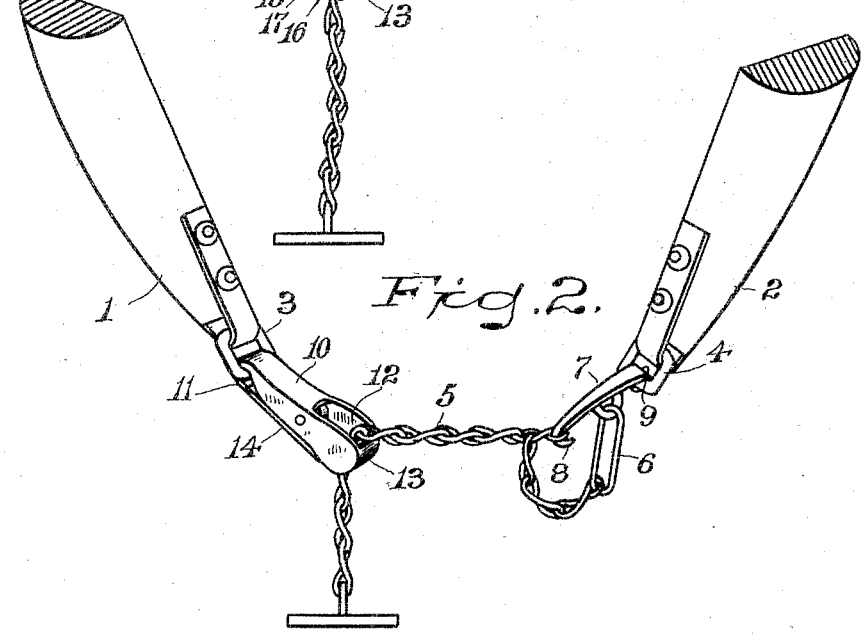
Figure 3:
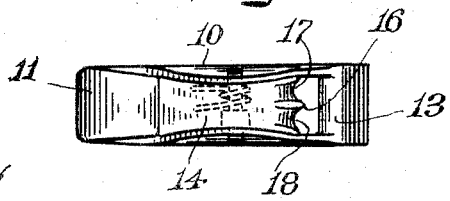

In the accompanying drawings, which form a part of this application, Figure 1 is a perspective view illustrating my improvement applied to a pair of hames to tighten the same; Fig. 2, a view similar to Fig. 1, but showing the take-up hook engaged with a remote chain-link; and Fig. 3, a bottom view of what will be hereinafter termed a "box."

Similar numbers of reference denote like parts in the several figures of the drawings.

1 2 represent ordinary hames, terminating at their lower ends in the usual eyes 3 4.

5 is the chain of any suitable length and terminating at one end in an elongated loop 6.

7 is a block pivoted at its under side to the free end of said loop and terminating in downwardly-extending hooks 8 9, the latter adapted to be connected with the eye 4, while the hook 8 normally depends within the loop 6.

10 is a box which terminates at one end in an open hook 11, which is adapted to be connected with the hame-eye 3, so as to be readily disengaged therefrom when necessary. The other end of said box is open, as shown at 12, so as to admit the free end of the chain and is provided with a cross-bar 13, which is rounded, so that the chain will work freely against the same.

14 is a lever which is pivoted at or about its middle portion within the box and between the sides thereof, and 15 is a short coil-spring supported around the pivot of the lever, one end of said spring being secured to the lever itself, while the other end is secured to the box, the function of said spring being to readily return the lever to normal position. The inner extremity of this lever has a beak 16 projecting from its center toward the cross-bar 13, and on each side of this beak and slightly in the rear thereof are lateral shoulder portions 17 18.

The outer extremity of the lever in conjunction with the hook 11 operates like an ordinary snap-hook, and the inner end of said lever engages with the links of the chain after the manner of a pawl. In my patented construction above referred to a pawl was engaged in a similar connection; but said pawl had no shoulders whatever, and since the links of the chain could ride toward the base of the pawl the chain could be tightened only by pulling the free end of the same away from the pawl. In my present improvement the shoulders keep the links of the chain always in the same relative position with respect to the beak, and the chain can therefore be tightened by pulling in any direction, whether away from or toward the pawl.

Sometimes after the chain has been tightened half a dozen or more links at the free end of the chain will hang down and will cause great annoyance by swaying to and fro, and I therefore have provided the hook 8 at the inner end of the block 7, which hook may be engaged with any remote link, and thereby take up the chain, so that after the hames have been tightened only a few links will depend at the free end of the chain, as shown at Fig. 2.

While the block with the take-up hook is of considerable advantage in some instances, I do not wish to be limited thereby, since the chain may be permanently or otherwise attached to one of the hames in any suitable manner, and the main feature of my invention relates to the box and the construction and operation of the resilient lever.

Having thus described my invention, what I claim as new, and desire to secure by Letters Patent, is—

1. A hame-fastener comprising a chain having an elongated loop at one end, a link-block pivoted at its under side to the free end of said loop and terminating in downwardly-extending hooks one of which is adapted to be connected with one of the hames while the other of said hooks normally depends within said loop, a box terminating at one end in an open hook adapted to be connected with the other hame while the inner end of said box is open and provided with a rounded cross-bar through which opening and over which cross-bar the free end of said chain is passed, and the resiliently-acting lever pivoted near its middle portion within said box, the inner extremity of said lever being formed into a beak with lateral shoulders extending slightly in the rear and on both sides thereof, while the outer extremity of said lever normally closes said open hook, substantially as set forth.

2. A hame-fastener comprising a chain provided at one end with means for attaching said chain to one hame, a box terminating at one end in an open hook adapted to be connected with the other hame while the inner end of said box is open and provided with a rounded cross-bar through which opening and over which cross-bar the free end of said chain is passed, and the resiliently-acting lever pivoted near its middle portion within said box, the inner extremity of said lever being formed into a beak with lateral shoulders extending slightly in the rear and on both sides thereof, while the outer extremity of said lever normally closes said open hook, substantially as set forth.

In testimony whereof I affix my signature in presence of two witnesses.

JOHN H. PARMELEE.

Witnesses:
  F. W. SMITH, Jr.,
  M. T. LONGDEN.